United States Patent [19]

Maass et al.

[11] 4,439,592

[45] Mar. 27, 1984

[54] PREPARATION OF POLYDIORGANOSILOXANES HAVING TERMINAL TRIORGANOSILYL GROUPS

[75] Inventors: Günther Maass, Bergisch-Gladbach; Hans J. Lücking, Leverkusen; Karl Brändle, Bergisch-Gladbach; Hans-Heinrich Moretto, Cologne, all of Fed. Rep. of Germany

[73] Assignee: Bayer Aktiengesellschaft, Leverkusen, Fed. Rep. of Germany

[21] Appl. No.: 417,720

[22] Filed: Sep. 13, 1982

[30] Foreign Application Priority Data

Oct. 2, 1981 [DE] Fed. Rep. of Germany ....... 3139316

[51] Int. Cl.$^3$ .............................................. C08G 77/06
[52] U.S. Cl. ...................................... 528/14; 528/37; 556/462
[58] Field of Search ...................... 556/462; 528/37, 14

[56] References Cited

U.S. PATENT DOCUMENTS

| | | | |
|---|---|---|---|
| 3,779,787 | 12/1973 | Haslam et al. | 427/290 |
| 3,779,987 | 12/1973 | Razzano et al. | 524/14 |
| 3,978,104 | 8/1976 | Razzano | 528/37 |
| 4,341,888 | 7/1982 | Razzano | 528/37 |

*Primary Examiner*—Melvyn I. Marquis
*Attorney, Agent, or Firm*—Sprung, Horn, Kramer & Woods

[57] ABSTRACT

The present invention relates to a process for the preparation of trioganosilyl-terminated polydiorganosiloxanes by basic polymerization of cyclic diorganopolysiloxanes and triorganosilyl-terminated siloxanes, wherein, before the polymerization, a part of the cyclic diorganosiloxane is distilled off in the presence of the polymerization catalyst at a temperature which is at least 10° C. below the polymerization temperature.

6 Claims, No Drawings

PREPARATION OF POLYDIORGANOSILOXANES HAVING TERMINAL TRIORGANOSILYL GROUPS

The present invention relates to a process for the preparation of triorganosilyl-terminated polydiorganosiloxanes, which permits cyclic diorganosiloxanes having low, varying moisture contents to be used as starting materials.

The preparation of triorganosilyl-terminated polydiorganosiloxanes by basic polymerization of cyclic diorganosiloxanes and triorganosilyl-terminated diorganosiloxanes has been disclosed. The most important cyclic diorganosiloxane is octamethylcyclotetrasiloxane, which is employed as a starting material for many silicone polymers. Industrial octamethylcyclotetrasiloxane frequently contains small amounts of water which, in the basic polymerization, lead to Si—OH groups at the chain ends of the polymers. As a result, the properties of the polymers, for example the shrinkage characteristics and the interaction with fillers, are very adversely affected. For certain areas of use, polymers with an extremely low Si—OH content are required, for example in hot-vulcanizing silicone rubber crosslinked with peroxides, and in cold-vulcanihing silicone rubber which is crosslinked via the addition of Si—H groups to vinyl radicals. Starting from cyclic siloxanes, polymers of this type can be prepared only from extremely dry, clean raw material. Industrial octamethylcyclotetrasiloxane is not suitable for this purpose, even when it is dried by distilling off a part of the cyclic siloxane before the alkaline polymerization, for example according to U.S. Pat. No. 3,779,987. According to a known procedure, the polymerization catalyst, for example KOH, is then added, and after the reaction starts, a certain amount of $(CH_3)_3Si[OSi(CH_3)_2]_xOSi(CH_3)_3$, for example, is added to regulate the chain length. After a sufficiently long equilibration time at about 160° C., the basic catalyst is neutralized and volatile constituents are evaporated off, if appropriate.

However, in spite of the drying step described, experience has shown that this process gives a proportion of polymers having terminal SiOH groups. This is also evident, inter alia, from a viscosity which is too low with respect to the amount of regulator employed. Since the moisture contents in industrial octamethylcyclotetrasiloxane also vary, it is not possible to selectively and reproducibly adjust the polymer viscosity.

Surprisingly, it has been found that the quality and reproducibility of the polymers are very much improved when the basic polymerization catalyst is already added before the distillative drying step, and the temperature is not allowed to exceed approx. 120° C. during the distillation. If, thereafter, equilibration is effected with the chain length regulator at about 160° C., and the procedure is continued as described above, polymers are obtained which possess a significantly higher viscosity with the same regulator content. At the same time, the shrinkage characteristics and the interactions with fillers become substantially more advantageous when the polymers are used later. In the case of varying amounts of water in the starting material, the variations in the polymer viscosity are greatly reduced using this procedure.

The subject of the present invention is therefore a process for the preparation of triorganosilyl-terminated polydiorganosiloxanes by basic polymerization of cyclic diorganopolysiloxanes and triorganosilyl-terminated siloxanes, characterized in that, before polymerization, a part of the cyclic diorganosiloxane is distilled off in the presence of the polymerization catalyst at a temperature which is at least 10° C. below the polymerization temperature.

A particularly suitable cyclic diorganosiloxane is octamethylcyclotetrasiloxane, to which, however, other cyclic siloxanes, such as, for example, hexamethylcyclotrisiloxane, decamethylcyclopentasiloxane, hexaphenylcyclotrisiloxane, octaphenylcyclotetrasiloxane, tetramethyltetravinylcyclotetrasiloxane and the like, can also be admixed.

In the process according to the invention, octamethylcyclotetrasiloxane, for example, is initially introduced into a polymerization vessel, about 5–20 ppm of KOH are added, and a vacuum of 45–80 mbar is applied. The content is then heated slowly, while stirring, until distillation occurs between about 90° and 110° C. Approx. 5–10% by weight of the octamethylcyclotetrasiloxane are then distilled off, while stirring. The vessel is then brought to normal pressure with nitrogen or another inert gas, and is heated to about 160° C. In a manner which is in itself known, the chain length regulator is added as soon as the polymerization begins, equilibration is effected, the mixture is neutralized, and the polymer is thoroughly heated.

The temperature range of the distillative drying step must be chosen, depending upon the catalyst and starting material, so that the temperature at which the polymerization begins is not reached. If the polymerization begins during the distillative drying step, this batch will inevitably be brought to completion, according to the state of the art, with the disadvantages for the polymer which have been described. In the case of octamethylcyclotetrasiloxane and KOH, about 120° C. should not therefore be exceeded. Distillation is preferably carried out at between 90° and 100° C. The vacuum is then about 45–70 mbar. It has proved advantageous to stir the mixture of octamethylcyclotetrasiloxane and the catalyst for at least half an hour before the distillation is begun.

Suitable basic polymerization catalysts are, in particular, alkali metal hydroxides, especially NaOH, KOH or CsOH, or the corresponding siloxanolates. It is advantageous to employ the hydroxides in a finely ground form. A substantial advantage of the process according to the invention is that the amount of the catalyst required for the distillative drying step need not be greater than the amount required for the subsequent polymerization. In fact, complicated operations would have been necessary otherwise in order to separate off the excess catalyst. 5–20 ppm are sufficient when KOH is used. The fact that even these catalytic trace amounts produce so favorable an effect is very surprising, and was not to be expected according to the state of the art, even by one skilled in the art. Depending on the water content of the starting substance and on the desired degree of dryness, the proportion of the distillate should be about 5–15% by weight. However, the amount of distillate produced is not of such great importance. A further advantage of the process according to the invention is, namely, that the distillate, possibly after drying or, if appropriate, separating off a liquid, aqueous phase, can be employed again in the next batch, if this is carried out by the process according to the invention. This was hitherto also not possible by the state of the art. It has in fact been shown that no distillate could be employed in the polymerization process according to the state of the art. In such cases, the polymerization could not be carried out with the usual amounts of catalyst, which should be as low as possible. As a further drying measure, a dry inert gas can be passed in during the distillation and prior to it.

Using this process, which can also be carried out continuously, it is possible to prepare triorganosilyl-terminated siloxanes having very few Si—OH groups and with a selected, reproducible viscosity, from industrial octamethylcyclotetrasiloxane. The process permits reuse of the water-containing distillates produced, and can be carried out in conventional polymerization plants, without additional plant components. In addition, when the process according to the invention is used, it is possible, in spite of varying water content in the batch, to establish a moisture value which is dependent on the specific process parameters, but is constant. As a result, the variations in the polymer viscosity are greatly reduced.

The examples which follow are intended to illustrate the process in more detail.

EXAMPLE 1

A 50 l vessel which was equipped with a helical ribbon impeller, a condenser and distillate receivers, and which contained 45 kg of octamethylcyclotetrasiloxane and 0.36 g of powdered KOH, was evacuated to 50 mbar and the content was then heated to 94° C. in the course of 1 hour, while stirring. 4.5 kg of the octamethylcyclotetrasiloxane distilled off at approx. 94° C. and 50 mbar. The vessel was then brought to normal pressure with nitrogen, and the content was further heated. When a temperature of about 150° C. was reached, the polymerization began, and was detected by an increase in the viscosity of the content of the vessel. 89.1 g of $(CH_3)_3SiO((CH_3)_2SiO)_{10}Si(CH_3)_3$ were then added, and the mixture was kept at 160° C. for 6 hours, while stirring. After the addition of 16.5 g of siloxane containing phosphoric acid, and stirring for one hour, volatile constituents are expelled by heating up to a bottom temperature of 160° C. at 3 mbar. After the polymer had been cooled, it had a penetrometer value of 950 (0.1 mm per minute) at 20° C. In the measurement, the penetrating cylinder had a diameter of 0.6 cm and a weight of 103.9 g.

EXAMPLE 2

(for comparative purposes, not according to the invention)

45 kg of octamethylcyclotetrasiloxane of the same quality as that of Example 1 were initially introduced into a vessel identical to that of Example 1, and 4.5 kg were distilled off at approx. 175° C. and under normal pressure. After the substance had been cooled to 165° C. and 0.36 g of powdered KOH had been added, the polymerization began at this temperature within half an hour. The addition of 89.1 g of $(CH_3)_3SiO((CH_3)_2SiO)_{10}Si(CH_3)_3$, the equilibration, the neutralization and the expulsion of volatile constituents by heating were effected as described in Example 1. The resulting polymer had a penetrometer value of 1,350 (0.1 mm per minute).

EXAMPLE 3

The experiment corresponding to Example 1 was repeated with 0.3 g of powdered NaOH instead of 0.36 g of KOH. The equilibration temperature was increased to 170° C. and the equilibration time was prolonged to 9 hours. The resulting polymer had a penetrometer value of 980 (0.1 mm per minute) at 20° C.

EXAMPLE 4

350 kg of a mixture of 340 kg of octamethylcyclotetrasiloxane and 10 kg of tetravinyltetramethylcyclotetrasiloxane were stirred with 10 ppm of KOH for 1 hour in a 500 l vessel equipped with a gate paddle agitator. A vacuum of about 70 mbar was then applied, and the mixture was heated up in the course of half an hour. 36 kg of octamethylcyclotetrasiloxane then distilled off at 101° C. After the vessel had been flushed with nitrogen, the mixture was heated to 160° C. 52.9 kg of a short-chain vinyldimethyl-terminated siloxane were added after the polymerization had begun in order to regulate the chain length. After an equilibration time of 5 hours at 160° C., it was possible to neutralize the oily product with siloxane containing phosphoric acid, and then to expel volatile constituents by heating to 160° C./3 mbar. The product (315 kg) had a viscosity of 212 cp/20° C. After 2% by weight of tetraethoxysilane and 1% by weight of dibutyl-tin dilaurate had been added to a sample, the latter showed no signs of crosslinking on standing for 24 hours in the air, a sign that no Si—OH groups were present in the polymer.

EXAMPLE 5

(not according to the invention)

350 kg of a mixture of 340 kg of octamethylcyclotetrasiloxane and 10 kg of tetravinyltetramethylcyclotetrasiloxane of the same quality as that of Example 4 were again stirred in the same vessel, according to Example 4. In order to dry the mixture, 36 kg of octamethylcyclotetrasiloxane were distilled off at about 175° C., after volatile constituents had been expelled by heating. The polymerization began at about 170° C., after the addition of 10 ppm of powdered KOH. Before equilibration for 5 hours, 52.9 kg of vinyldimethyl-terminated siloxane were added. The further steps were effected as in Example 4. The oil (312 kg) had a viscosity of 185 cp and crosslinked with 2% by weight of tetraethoxysilane and 1% by weight of dibutyl-tin dilaurate in the course of 3 hours, proof of the presence of Si—OH-terminated polymers in the vinyldimethyl-terminated product.

It will be appreciated that the instant specification and examples are set forth by way of illustration and not limitation, and that various modifications and changes may be made without departing from the spirit and scope of the present invention.

We claim:

1. In the preparation of a triorganosilyl-terminated polydiorganosiloxane by the polymerization at elevated temperature of a cyclic diorganopolysiloxane with a triorganosilyl-terminated siloxane chain length regulator in the presence of a basic catalyst, the improvement which comprises, before polymerization, distilling off a part of the cyclic diorganosiloxane in the presence of the polymerization catalyst at a temperature which is at least 10° C. below the temperature at which polymerization commences.

2. A process according to claim 1, wherein the distillation is effected while stirring under reduced pressure.

3. A process according to claim 1, wherein the cyclic diorganosiloxane is heated up together with the catalyst under reduced pressure.

4. A process according to claim 1, wherein the diorganosiloxane is stirred with the catalyst for at least half an hour before the distillation.

5. A process according to claim 1, wherein octamethylcyclotetrasiloxane is employed as the diorganosiloxane and potassium hydroxide is employed as the catalyst.

6. A process according to claim 5, wherein about 5 to 15% of the octamethylcyclotetrasiloxane is distilled off under reduced pressure at a temperature below about 120° C. and in the pressure of about 5 to 20 ppm of basic catalyst based on the material being polymerized, the distillate being recycled for use in a subsequent polymerization.

* * * * *